United States Patent [19]
Patino et al.

[11] Patent Number: 5,648,715
[45] Date of Patent: Jul. 15, 1997

[54] METHOD AND APPARATUS FOR CURRENT COMPENSATION OF A BATTERY IN A CHARGER

[75] Inventors: Joseph Patino, Pembroke Pines; Robert B. Ford, Tamarac, both of Fla.

[73] Assignee: Motorola, Inc., Schaumburg, Ill.

[21] Appl. No.: 562,487

[22] Filed: Nov. 24, 1995

[51] Int. Cl.$^6$ .......................... H01M 10/44; H01M 10/46
[52] U.S. Cl. .................... 320/22; 320/32; 320/43
[58] Field of Search ............................ 320/5, 10, 22, 320/32, 43

[56] References Cited

U.S. PATENT DOCUMENTS

| | | | |
|---|---|---|---|
| 4,006,396 | 2/1977 | Bogut | 320/2 |
| 5,164,652 | 11/1992 | Johnson et al. | 320/2 |
| 5,191,277 | 3/1993 | Ishikura et al. | 320/22 |
| 5,200,686 | 4/1993 | Lee | 320/2 |
| 5,325,040 | 6/1994 | Bogut et al. | 320/22 |
| 5,411,816 | 5/1995 | Patino | 429/7 |
| 5,493,199 | 2/1996 | Koenck et al. | 320/35 |

*Primary Examiner*—Peter S. Wong
*Assistant Examiner*—Patrick B. Law
*Attorney, Agent, or Firm*—Barbara R. Doutre

[57] ABSTRACT

A battery charging system (200) is capable of maintaining a fully charged battery (202) without overcharging or undercharging the battery regardless of the operating mode of the radio (204). Charging system (200) includes a charger (202) which senses the capacity of the battery (206) through a capacity resistor (224) at a capacity sense terminal (244). The charger (202) also senses the radio current through the same capacity sense terminal (244) using a current sensing device (226). Charger (202) continuously compensates for the current drain presented by the radio (204).

6 Claims, 3 Drawing Sheets

METHOD AND APPARATUS FOR CURRENT COMPENSATION OF A BATTERY IN A CHARGER

TECHNICAL FIELD

This invention relates to batteries and battery charging systems.

BACKGROUND

It is very common for batteries which are used in portable communication devices, such as two-way radios, to have a thermistor and a battery capacity resistor. The thermistor is used by a battery charger during the charging of the battery to determine the temperature of the battery and whether the battery is being charged properly. The capacity resistor is typically used by the charger to determine the capacity of the battery, prior to the battery being charged. The battery charger upon determining the battery capacity (e.g., 1000 milli-amp-hour maH) will select the proper charging rate to use, in order to optimally charge the battery.

Referring to FIG. 1, there is shown a prior art battery charging scheme consisting of a charger 102, radio battery 106 and radio 104. Radio 104 contains positive (B+) and negative (B−) battery terminals which are coupled to radio battery 106 via battery contacts 116 and 114, respectively. Battery 106 contains one or more battery cells 108, which dictate the voltage and current capacity of battery 106. Also included as part of the battery 106, are reverse discharge protection diode 118, a battery temperature indicator, such as thermistor (Rt) 112, and a battery capacity indicator, such as resistor (Rc) 110.

Charger 102 consists of a charger monitor circuit 128, which can consist of a well known microprocessor or microcontroller as known in the art and appropriate control software. Charger monitor circuit 128 controls charger control circuit 130 which provides current to battery 106 in order to charge the battery. A control signal is sent from charger monitor circuit 128 to charger control circuit 130 via bus 140, the control signal informs charger control circuit 130 as to how much current to source via line 129 to battery 106.

Charger monitor circuit 128 contains three analog-to-digital (A/D) ports 120, 122 and 124. A/D port 120 monitors the voltage on the B+ line. A/D port 122 senses the resistance of capacity resistor Rc 110, and A/D port 124 in turn senses the resistance of thermistor Rt 112 as its' resistance changes according to temperature which occurs once the battery begins charging. A/D ports 122 and 124 include external pull-up resistors 142, 144 respectively which are used to determine the resistance of Re 110 and Rt 112, by determining the voltage level at A/D ports 122 and 124, respectively.

Charger 102 and battery 106 in the prior art scheme use four lines connecting the charger 102 and battery 106. These lines include a B+ line 132 which provides the current to the battery, an Rc line 134 which is used to sense the capacity resistor 110, a thermistor sense line 136 which is used to sense the resistance value of thermistor 112, and a B− (ground) line 138.

Typically, charger 102 will continue charging the battery at a predetermined rate (1C) until the battery is charged to approximately 90% of its' full capacity. At this point, battery 106 reaches a predetermined temperature or temperature rise characteristic, as indicated by the thermistor sense line 136, and the charger 102 changes the charge rate to a lower charge rate, commonly referred to as a trickle charge rate. If the battery were to continue charging at the full charge rate (1C), it would become exothermic, and the battery cells could be damaged. The trickle charge rate allows the battery 106 to complete its' charge at a lower charge rate.

In the past, typical trickle charge rates have been in the approximate range of C/10. However, to improve battery life and battery performance, it is desirable to reduce the trickle charge rate, for example to a rate of C/20. Lowering the charge rate can present a problem for portable radio products whose standby currents are higher than the charger's trickle charge rate. If a radio, such as radio 104, is left "on" while the battery is charging at the lower charge rate, the battery 106 will never reach a fully charged state. This problem is further exacerbated if the radio 104 goes into a receive mode while the battery is being charged, drawing even higher current. For example, a battery that uses a charge rate of C=1000 mA and a trickle charge rate of 50 mA would never reach its' full charge capacity if the radio were left "on" while in the charger with a standby current of 90 mA. Even less capacity would be achieved if the radio were to scan through receive channels at, for example, a rate of 300 mA. Thus, a user could remove the radio from the charger and potentially be faced with a partially charged or even fully discharged battery.

Another problem arises if a radio with a fully charged battery is placed in the charger with the radio turned "off". The charger, recognizing the fully charged battery, goes into trickle charge and continues to trickle charge even to the point of overcharging the battery. In the past, for certain battery chemistries such as nickel cadmium, overcharging was not an issue because of the robustness of the chemistry. However, with the increasing interest in lithium ion and nickel metal hydride technology, the issue becomes more serious as these types of battery technologies can be easily damaged by overcharging.

Deep discharge of a battery is yet another related issue that can occur between the battery and the radio. A deep discharge condition exists when the battery voltage continues to drop below its minimum recommended cut off threshold. This phenomena can occur when a radio is left "on" and the battery continues to drain, even after the radio stops functioning, due to the load presented by the radio. Draining the battery down to these low voltage levels can lead to cell reversal and shorts which adversely affects the battery's cycle life performance.

Hence, there is a need for a battery and charger system capable of completing a charge cycle and maintaining a fully charged battery without overcharging or undercharging the battery. A battery that also prevents deep discharge would be a further enhancement to the system.

BRIEF DESCRIPTION

DETAILED DESCRIPTION OF THE PREFERRED EMBODIMENT

Figure 1:
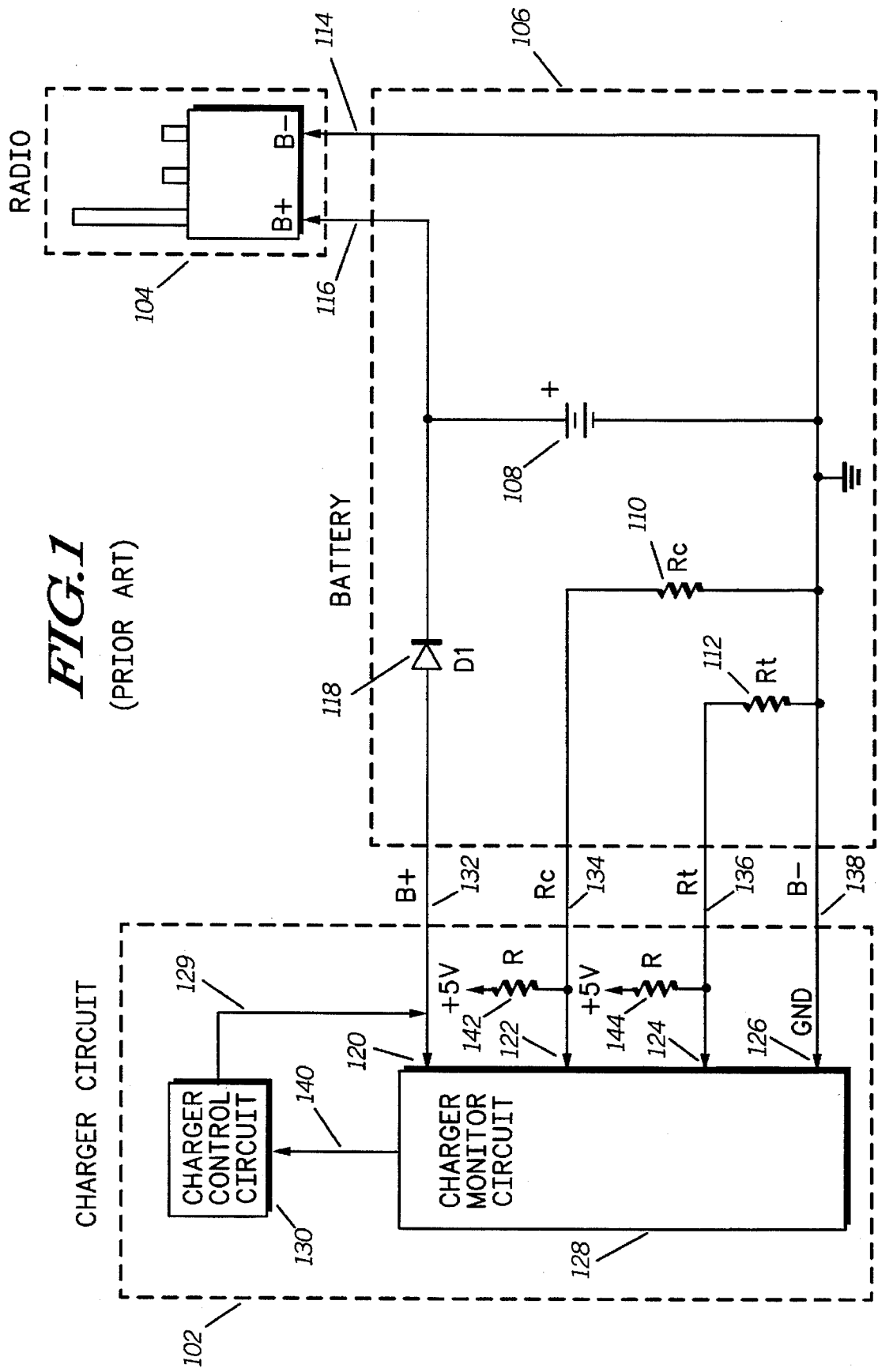
FIG. 1 is a schematic of a prior art battery charging system.
Figure 2:
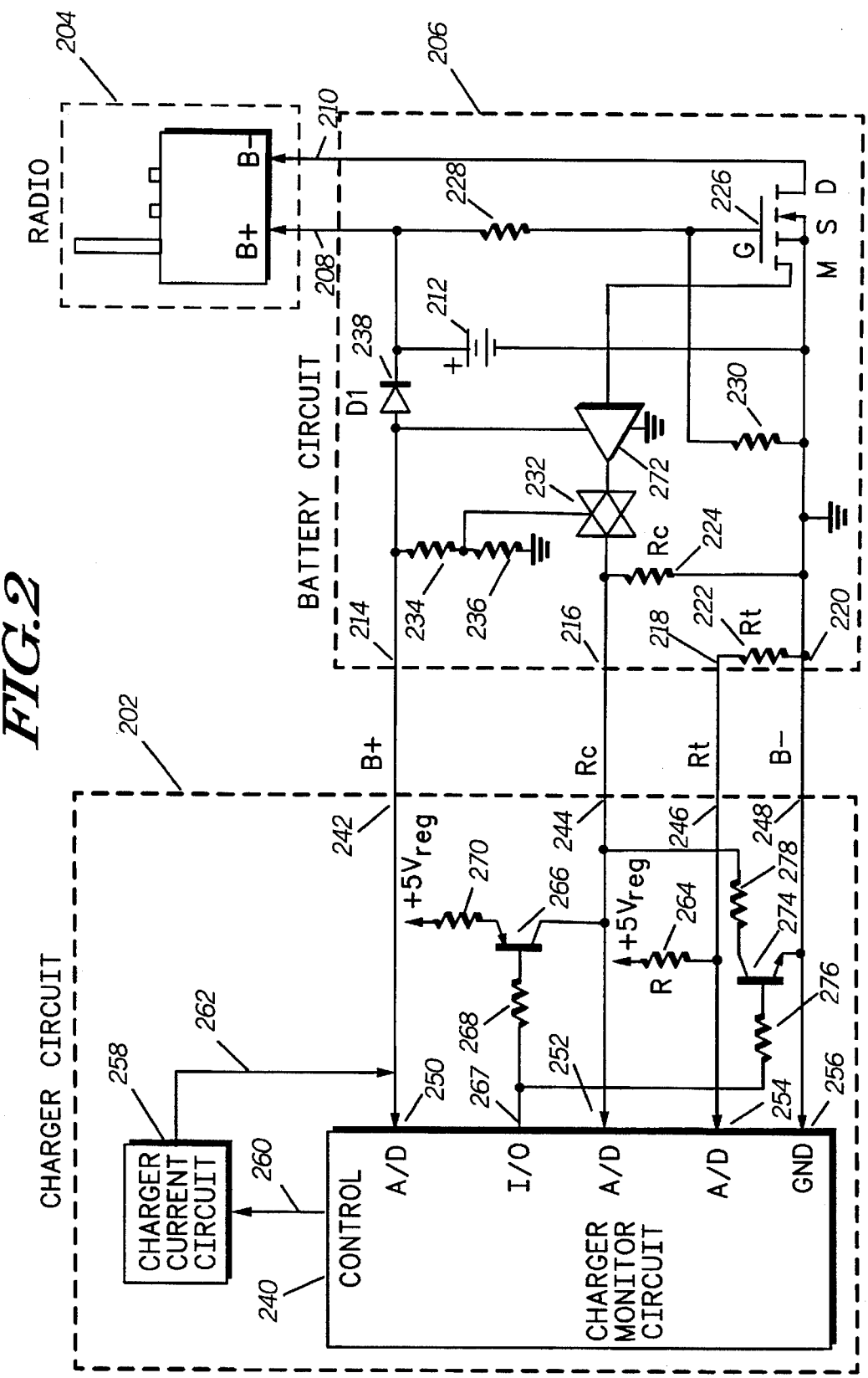
FIG. 2 is a schematic of a battery charging system in accordance with the present invention.

Referring now to FIG. 2, there is shown a battery charging system 200 in accordance with the present invention. Charging system 200 comprises a battery charger 202, a battery such as radio battery 206, and a battery operated communication device, such as radio 204. Radio 204 includes positive and negative (B+ and B−) terminals which are coupled to battery 206 via battery contacts 208 and 210.

Battery 206 comprises one or more battery cells 212 which dictate the voltage and storage capacity for battery 206. For example, a radio battery can be designed depending on the number of battery cells used, to have an operating voltage of 7.5 volts and a storage capacity of 1500 milli-amp-hours (maH). Battery 206 includes four battery charging contacts, first contact 214, second contact 216, third contact 218, and fourth contact 220. First contact 214 provides the B+ (positive) battery charging contact for battery 206, and fourth contact 220 provides the B− or ground contact. Contacts 214 and 220 will also be referred to as the battery charging contact 214 and the battery ground contact 220 respectively. Second contact 216 provides a sensing contact for sensing the capacity of the battery 206, while third contact 218 provides a sensing contact for sensing the temperature of the battery. Contacts 216 and 218 will also be referred to as the capacity sense contact 216 and the temperature sense contact 218 respectively.

Coupled between temperature sense contact 218 and battery ground contact 220 is a first battery characterization device, such as thermistor Rt 222, which changes resistance as the temperature of battery 206 changes. The temperature of battery 206 typically increases as the battery is being charged, with an abnormally high temperature indicating that the battery is being charged too rapidly. Thermistor 222 thermally protects battery 206 during charging, by informing charger 202 of the approximate temperature of battery 206.

Coupled between the capacity sense contact 216 and battery ground contact 220 is a second battery characterization device, such as capacity resistor Rc 224. Battery capacity resistor 224 is used to determine the battery capacity and chemistry of the battery 206. In accordance with the present invention, the battery capacity sense contact 216 is also used for determining the amount of current being drawn by the radio 204.

In accordance with the present invention, battery 206 further includes a current sensing device, such as a sense field-effect transistor FET 226 or similar device. Sense FET 226 is preferably an N-channel sense metal-oxide-semiconductor FET which includes drain (D), gate (G), source (S), and mirror (M) terminals. Sense FET 226 is operatively biased through its' gate from the junction of a resistive divider formed of resistors 228 and 230 coupled in series between the B+ terminal 208 and battery ground contact 220. Resistors 228, 230 are chosen sufficiently large, preferably in the mega-ohm range, to minimize the amount of self discharge on the battery 206. The source terminal of sense FET 226 is coupled to battery ground 220, while the drain terminal is coupled back to the radio ground terminal B− through contact 210. The characteristic series resistance, $Rds_{on}$, between the drain and source terminals of sense FET 226 is small enough that when sense FET 226 is biased "on", the B− terminal of radio 204 is effectively coupled to battery ground 220. A predetermined portion of the current being drawn through the source/drain junction of sense FET 226 is mirrored onto the mirror terminal. Thus, the sense FET 226 operates as a current sensing device for sensing the current of the radio 204.

In accordance with the present invention, battery 206 also includes a switching device 232, such as a transistor or similar switching device, which allows the sensed radio current, here the mirrored current of sense FET 226, to be switched on to and off of the battery capacity sense contact 216, preferably through an amplifier stage 272, such as an operational amplifier (op-amp) or similar amplifying device well known in the art. Switch 232 is preferably biased through the junction of a resistive divider formed of resistors 234 and 236 coupled in series between the battery charging contact 214 and ground 220. Resistors 234, 236, and switching device 232 place no load on the battery 206 since they are powered from the charger side of reverse discharge protection diode 238. Coupled between battery charging contact 214 and the positive terminal of battery cells 212 is included a reverse current protection diode (D1) 238. Diode (D1) 238 protects battery cells 212, if the battery charging contact 214 should accidentally short to the battery ground contact 220.

Referring now to the charger 202 of system 200, charger 202 comprises a charger monitor circuit or controller 240, which can be a well known microcontroller or microprocessor as known in the art. When battery 206 is inserted into charger 202 the first, second, third, and fourth battery contacts 214, 216, 218, and 220 mate with first, second, third, and fourth charger terminals 242, 244, 246, and 248 respectively. Charger terminals 242, 244, and 246 correspond to analog-to-digital (A/D) input ports 250, 252, and 254 respectively which are part of controller 240. First charger terminal 242 will also be referred to as battery charger terminal 242 while fourth charger terminal will also be referred to as ground charger terminal 248. Second charger terminal 244 will also be referred to as the battery capacity sense terminal 248, while third charger terminal 246 will also be referred to as battery temperature sense terminal 246. Ground charger terminal 248 couples to a ground port 256 of charger monitor circuit 240.

Charger 202 also includes a charger current circuit 258, which acts as a programmable current source to source current to battery 206. Controller 240 informs charger control circuit 258 as to how much current to source to battery 206 via a control signal sent via bus 260. Once informed to source current, charger control circuit 240 begins sending current via line 242 to the battery charging contact 214 of battery 206. Battery charger terminal 242 senses the voltage level of battery 206 using A/D port 250 to check for open or shorted cells and for voltage cut off. Charger terminal 246 includes a conventional pull-up resistor 264 in order to determine the resistance of thermistor 222 by measuring the voltage at A/D port 254.

Charger 202 further comprises a switch, which can take the form of a PNP transistor 266 as shown or other type of switching device. The base of transistor 264 is operatively biased to input/output (I/O) port 267 of controller 240 via resistor 268. The emitter of transistor 266 is coupled to a regulated supply voltage, Vreg, through a resistor 270 while the collector terminal is coupled to the battery capacity sense terminal 244. The collector of transistor 266 is also coupled to the A/D port 252 of the charger monitor circuit 240. Resistor 270 operates as a pull-up resistor for the battery capacity sense terminal 244.

Charger 202 further comprises a second switch, which can take the form of a NPN transistor 274 as shown or other type of switching device. The base of transistor 274 is coupled the I/O port 267 of controller 240 via resistor 276. The collector of transistor 274 is coupled via resistor 278 to the battery capacity sense terminal 244, while the emitter terminal is coupled to ground 248. Resistor 278 operates as a pull-down resistor for the battery capacity sense terminal 244.

In accordance with the present invention, charger 202 determines the battery capacity of battery 206, the battery temperature of battery 206, and the current drain of the radio 204. The charger 202 can then compensate, if need be, for the current drain presented by the radio 204. In operation, when a battery powered portable radio (formed of battery 206 and radio 204) is first coupled to the charger 202, the battery temperature is determined in the conventional manner through A/D port 254, resistor 264, and Rt thermistor 222. Initially, no current flows on the battery charging contact 214, so transistor 232 is biased off. The charger 202 then pulls I/O port 267 low, which turns transistor 274 "off" and turns transistor 266 "on" switching in pull-up resistor 270 onto battery capacity terminal 244. Charger 202 can then measure the capacity of Rc capacity resistor 224. Thus, charger 202 reads the temperature of the battery through A/D port 254 and the capacity of the battery through A/D port 252. Based on the measured capacity, the charger determines what type of battery is being charged and the rate of charging required.

Charger 202 then starts charging the battery 206, based on its determination of capacity by turning on current through the battery charging terminal 242. Biasing circuit 234/236 now turns on transistor 232 and allows the mirrored current from sense FET 226, which is amplified through gain stage 272, to appear at capacity sense contact 216. Charger 202 can then read the current being drawn through radio 204. This is accomplished by pulling the I/O port 267 low, which turns transistor 266 "off", and turns transistor 274 "on". Pull-down resistor 278 and Rc capacity resistor 224 are thus placed in parallel to form an equivalent resistance, Req. The equivalent resistance, Req, is then fed with the amplified current mirrored from capacity sense contact 216. For example, a sense FET, such as a T-MOSFET sold as part number MTP40N06M manufactured by Motorola, Inc., uses a mirror factor of approximately 1/950th of the current flowing through the FET's drain to source. This current is mirrored onto the capacity sense contact 216 and fed through the equivalent resistance, Req. Gain stage 272 preferably amplifies the voltage drop across Req so that A/D port 252, preferably an 8-bit A/D, can read the amount of current being drawn from the radio 204. While amplifier 272 is shown on the battery side 206, one skilled in the art realizes that the gain stage could also operate effectively on the charger side 202 of capacity sense contact 216 using another switch to short out the gain stage when only the Rc characteristic is being read. Charger current circuit 258 can then alter the amount or rate of charge to compensate for the current being drained by the radio 204. Thus, the capacity sense terminal senses both the capacity of the battery and the current drain of the radio.

In the preferred embodiment of the invention the microcontroller's A/D converter preferably has a resolution of 8-bits. The voltage read by A/D port 252 is translated into steps to determine the radio current 204. For an 8-bit A/D this translates into steps of 0–256. The values of pull-down resistor 278 and Rc capacity resistor 224 which form the equivalent resistance, Req, are optimized to accommodate for the resolution of the charging system, the current drains of the radio, and the mirror factor of the sensing device.

As an example, for an 8-bit A/D and a sense FET mirror factor of 1/950, the values of pull-down resistor 278 and capacity resistor 224 are preferably chosen such that their equivalent parallel resistance, Req, falls within the approximate range of 184 ohm–2.2 kilo-ohm for the following current modes of radio operation: (note: all values are approximate)

| for a given value of Rc = 200 ohms | | | | |
|---|---|---|---|---|
| operating mode | current (A) | Req(ohms) | M factor | A/D steps |
| transmit | 2.1 | 184 | 950 | 21 |
| receive | 0.4 | 184 | 950 | 4 |
| standby | 0.1 | 184 | 950 | 1 |
| off | 0 | 184 | 950 | 0 |

| for a given value of Rc = 68000 ohms | | | | |
|---|---|---|---|---|
| operating mode | current (A) | Req(ohms) | M factor | A/D steps |
| transmit | 2.1 | 2200 | 950 | 251 |
| receive | 0.4 | 2200 | 950 | 48 |
| standby | 0.1 | 2200 | 950 | 12 |
| off | 0 | 2200 | 950 | 0 |

The above range works well within the limits of 0–256 steps under the given conditions. Other resistor values and ranges can be determined for systems of different resolutions, current drains, and sensing factors.

The charging system 200 described by the invention can increase or decrease the charge rate to suit the operating mode of the radio 204 without adversely affecting the battery. Thus, a radio having standby current that's higher than the charger's trickle charge rate can be left on while in the charger. The charger 202 automatically increases its' charge rate to compensate for the higher current drain without overcharging the battery. If the radio 204 switches into a receive mode requiring even more current, the charger 202 as described by the invention determines and automatically compensates for the extra required current. Thus, the user is assured of a fully charged battery when the battery 206 is removed from the charger 202.

The battery charger system 200 in accordance with the present invention similarly prevents overcharging of the battery 206 when a fully charged battery is placed on the radio 204, with the radio turned off, and placed in the charger. Trickle charging will cease once the battery is fully charged and the charger 202 recognizes that the radio 204 is not drawing any current. Thus, the potential of overcharging of the battery 206 is eliminated.

In yet another aspect of the invention, the battery 206 further provides deep discharge protection. Many of today's battery technologies, such as lithium ion and nickel metal hydride, have a predetermined voltage level beneath which they should not be discharged. In accordance with this embodiment of the invention, resistors 228 and 230, which provide the bias for sense FET 226, also set a cut off threshold level for battery 206. For example, if battery 206 should not be operated below 6 volts, resistors 228 and 230 can be selected such that their ratio forces the gate of sense FET 226 to cut off at approximately 6 volts. This prevents any current from flowing through sense FET 226, and therefore the load of the radio 204 is switched off from the battery 206 at the B– terminal 210. Thus, the cells 212 are protected from deep discharge and the integrity of the cells can be maintained.

Figure 3:
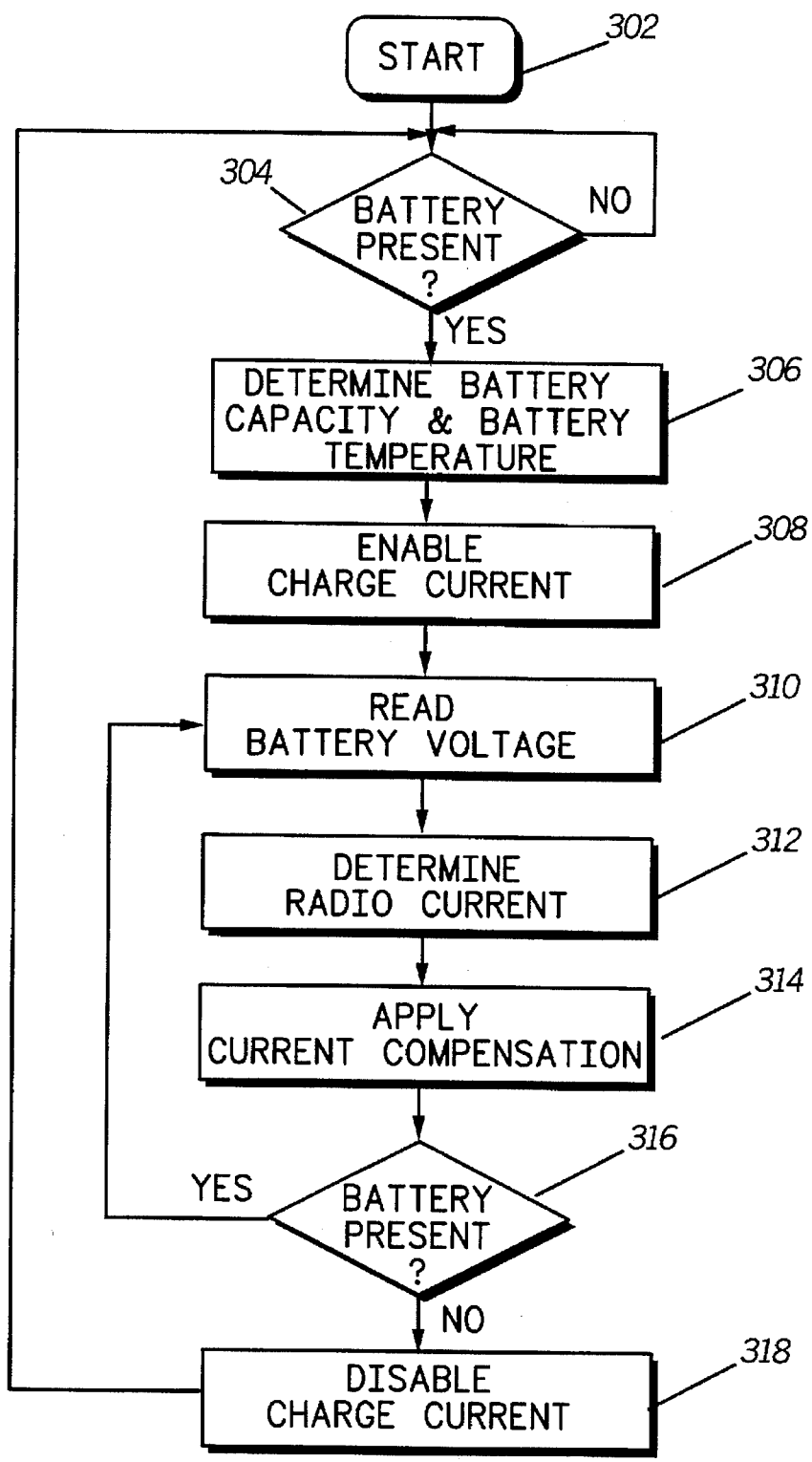
FIG. 3 is a flow chart a battery charging system in accordance with the present invention.

Referring now to FIG. 3, there is shown a flow chart 300 in accordance with the preferred embodiment of the invention. Flow chart 300 represents a charging scheme using the charging system 200 as described by the invention. The charging scheme starts at step 302 with the charger sensing for the presence of a battery at step 304. The sensing of the battery can be accomplished by reading the Rt terminal at A/D port 254. If the A/D port 254 is floating at regulated supply, no battery is present in the charger 202. If, however, a voltage drop is sensed at the A/D port 254 indicating the presence of a battery, the flow chart proceeds to step 306. In step 306, the charger 202 determines the capacity and temperature of the battery 206. This is accomplished by selectively switching in pull-up resistor 270 and switching out pull-down resistor 278 on to the capacity sense terminal 244 and reading the voltage of the restive divider formed of resistors 270 and Rc capacity resistor 224.

Based on the capacity of the battery 206 determined in step 306, the charger current is enabled at step 3 10. Once the charger current is enabled, the charger 202 starts charging the battery 206, and the battery voltage at battery charging terminal 242 can now be monitored at step 310. The flowchart 300 proceeds to step 312 where the radio current is determined. This is accomplished by selectively switching out the pull-up resistor 270 and switching in the pull-down resistor 278 onto the capacity sense terminal 244. The equivalent resistance, Req, formed of pull-down resistor 278 in parallel with Rc capacity resistor 224 is now formed. Switching device 232 is biased on to allow the mirrored current from sense FET 226, preferably amplified through gain stage 272, to be switched onto the capacity sense contact 216 and provide a voltage drop across the equivalent resistance, Req. The voltage drop across the equivalent resistance, Req, represents the current drain of the radio 204 and is read by the microcontroller 240. This current can vary depending on the operating mode of the radio.

Charger 202 can now compensate for the current being drained by applying current compensation at step 314. The charger circuit can vary its charge current to compensate or adjust for any extra required current at this step. If no radio current drain is present (i.e. the radio is off or the radio is not connected), the charger 202 continues to charge at the charge rate enabled in step 308. The presence of the battery is verified at step 316 via temperature sense terminal 246—the temperature sense terminal is continually monitored throughout the charging cycle. If the battery has been removed from the charger 202, the charge current is disabled at step 318, the microcontroller turns off switching devices 266 and 274, and the flowchart returns to step 304.

Accordingly, there has been provided a charging system 200 capable of completing a charge cycle and maintaining a fully charged battery without overcharging or undercharging the battery. The battery charging system described by the invention allows the battery to determine the current of the radio and for the charger to automatically and dynamically compensate for this current drain. Lower trickle charge rates can now be employed without being limited by the standby current of the radio. The charging system described by the invention thus adapts well to emerging battery cell technology for use in portable radio products. A user now has advantage of being able to place a battery powered portable radio in a charger without having to remember to turn off the radio or be considered about the different operating modes of the radio. The charging technique described by the invention detects and automatically adjusts the charge rate for each operating mode of the radio. The current sensing technique described by the invention provides the twofold advantage of sensing radio current and preventing deep discharge of the battery to provide a further enhancement to the overall system.

What is claimed is:

1. A method of charging a battery powered radio in a charger, comprising the steps of:

sensing the presence of the battery;

determining the capacity of the battery;

charging the battery in response to the capacity with a predetermined charge rate;

determining a current drain presented by the radio on the battery; compensating the charge rate in response to the determined current drain; and switching off the current drain presented by the radio on the battery once the battery drops to a predetermined voltage threshold.

2. A method of charging as described in claim 1 wherein the step of determining a current drain further includes the step of monitoring the current drain presented by the radio on the battery and the step of compensating further includes the step of dynamically adjusting the charge rate in response to variations in the current drain.

3. A charging system for a battery powered portable radio having a portable radio portion coupled to a battery, comprising:

a charger, comprising:
   a charging terminal, a capacity sensing terminal, a temperature sensing terminal, and a ground terminal;
   a microcontroller; and
   first and second switching devices operatively biased from the microcontroller for selectively switching a pull up load or a pull down load to the capacity sensing terminal respectively;

a battery, comprising:
   first, second, third, and fourth battery contacts for mating with the charging terminal, the capacity sensing terminal, the temperature sensing terminal, and the ground terminal respectively;
   at least one battery cell having a positive and negative terminal, the negative terminal being coupled to the fourth contact;
   a thermistor coupled between the third and fourth contact;
   a capacity resistor coupled between the second and fourth contact;
   a diode having an anode and a cathode, the anode coupled to the first contact and the cathode coupled to the positive terminal of the at least one battery cell;

a current sensing device operatively biased between the positive terminal of the at least one battery cell and ground, the current sensing device mirroring a predetermined portion of the portable radio current; and a third switching device operatively biased from the positive terminal of the at least one battery cell, said third switching device providing the predetermined portion of mirrored current to the second contact when the pull down load is selectively switched to the capacity sense terminal, and said third switching device switching out the predetermined portion of mirrored current from the second contact when the pull up load is selectively switched to the capacity sense terminal.

4. A charging system as described in claim 3, wherein the portable radio portion presents a load to the battery, and the current sensing device switches off the load presented by the portable radio portion at a predetermined voltage threshold.

5. A charging system for a battery powered portable radio, comprising:

a charger, including:
   a controller for selectively sensing battery capacity and sensing current drain of the radio, said charger charging the battery at a predetermined charge rate in responsive to the battery capacity and dynamically compensating the predetermined charge rate in response to the current drain of the radio; and a battery, including:
  a capacity resistor indicating the battery capacity; and
  a current sensing circuit for sensing the current drain of the radio and mirroring a predetermined portion of the sensed current drain to the capacity resistor.

6. A charging system as described in claim 5, further comprising,
  at the battery:
  a gain stage for amplifying the predetermined portion of the sensed current drain.

* * * * *